Alvin T. Dunbar & James H. Fellows.
Hay Fork.
No. 109305
PATENTED NOV 15 1870
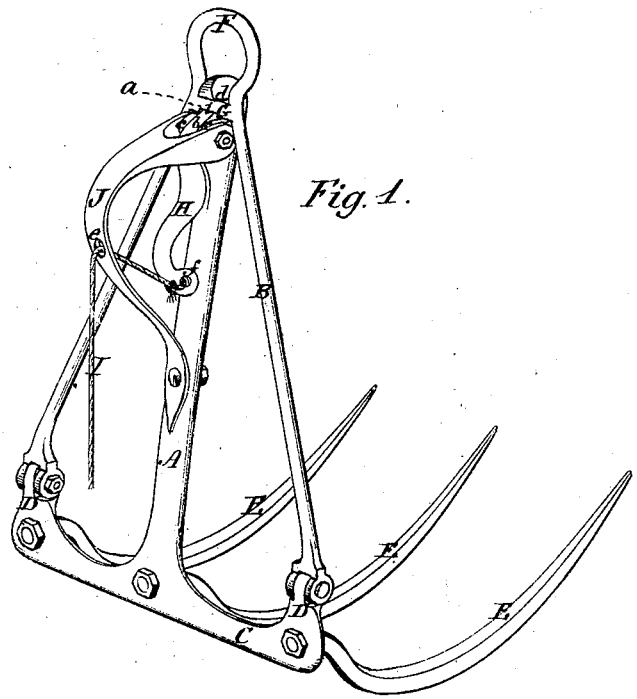
Fig. 1.
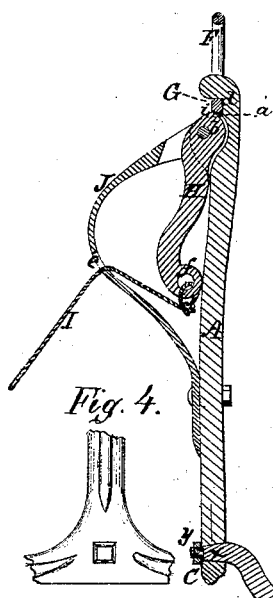
Fig. 2.
Fig. 4.
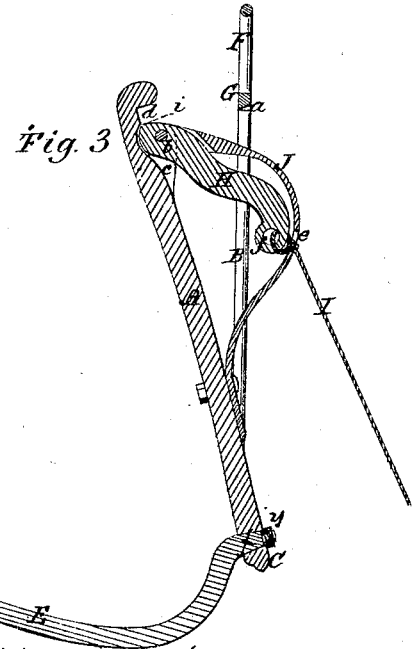
Fig. 3.
Witnesses
Frederic Artos
Chas. E. Upperman
Alvin T. Dunbar & James H. Fellows.
By his Attorneys,
Upperman & Johnson.

United States Patent Office.

ALVIN T. DUNBAR AND JAMES H. FELLOWS, OF ALBA, PENNSYLVANIA, ASSIGNORS TO A. T. DUNBAR AND GEORGE H. DEWEY, OF SAME PLACE.

Letters Patent No. 109,305, dated November 15, 1870.

IMPROVEMENT IN HORSE HAY-FORKS.

The Schedule referred to in these Letters Patent and making part of the same.

*To all whom it may concern:*

Be it known that we, ALVIN T. DUNBAR and JAMES H. FELLOWS, of Alba, in the county of Bradford and State of Pennsylvania, have invented certain new and useful Improvements in Hay-Forks; and we do hereby declare that the following is a full, clear, and exact description of the construction and operation of the same, reference being had to the accompanying drawing which makes part of this specification, and in which—

Figure 1 represents a view in perspective of the fork locked and in position to be loaded.

Figure 2 represents a vertical section, the parts occupying the position shown in fig. 1.

Figure 3 represents a vertical section, showing the lever unlocked to allow the fork to fall to dump its load.

Figure 4 is a section of the head.

The nature of our invention consists in the combination of the projecting head of the center bar with the pivoted lever and bail, arranged to operate as hereinafter set forth.

The head of our hay-fork is made of metal in T-shape.

A represents the center bar of said head, with arms C, extending in opposite directions.

Each of the arms C is at its outer end provided with an ear or lug, D, pointing upward, that is, in the same direction as the center bar A, and to said ears or lugs is hinged the bail B, which, at its upper end, forms the ring F, where the hoisting rope is attached.

The tines E E are constructed in any suitable manner and shape, and are provided with square shanks, *x*, where they are to pass through the head, and the ends of said shanks are formed as screw-bolts, upon which nuts, *y*, are placed.

The shanks *x* are slightly tapering, and the square holes made in the head for them are also slightly tapering, or all four sides are a little inclined inward. Thus, when the tine is inserted and the nut *y* placed on the screw end of the shank, said shank becomes, so to say, wedged in the head, so that the tine is very firmly secured in place and cannot turn.

Immediately below the ring F of the bail B is a cross-bar, G, which, on its under side, has an inclined notch, *a*, as shown in fig. 3.

The upper end of the head A C has a projection, *d*, which fits over the upper side of the cross-bar, and below said cross-bar, on the center bar A, is a guard, J, which also serves as a handle to insert the fork in the hay.

The upper end of this guard or handle J is slotted or forked, and within said end is pivoted a lever, H, which hangs down of its own weight along the bar A.

The upper pivoted end of this lever is cam-shaped, or provided with a cam-projection, *i*, so constructed and arranged that when the bar A is brought with its projection *d* over the cross-bar G of the bail, said cam will fit in and bear against the inclined notch *a* on the under side of said cross-bar, and effectually lock the fork, that is, prevent it from turning down while being hoisted.

Should the bail from any cause become detached at its lower ends, the projecting head of the center bar, in connection with the cam-shaped lever H and cross-bar G, will effectually lock and hold the bail in position until the hay which may be upon the fork is safely deposited.

At the lower end of the lever H is attached a rope, I, which passes through a hole, *e*, in the guard J, and by means of which the lever may be raised so as to trip the fork and release the load.

Having thus fully described our invention,

What we claim as new, and desire to secure by Letters Patent, is—

The center bar A, provided with projecting head *d*, the cam-shaped lever H, bail B, and cross-bar G, all combined and arranged to operate substantially as set forth.

In testimony whereof we have hereunto signed our names.

ALVIN T. DUNBAR.
JAMES H. FELLOWS.

Witnesses:
C. M. WILSON,
G. W. CARMAN.